United States Patent [19]

Glaus et al.

[11] 3,887,087
[45] June 3, 1975

[54] APPARATUS FOR STACKING LOOSELY ADJACENT ARTICLES

[75] Inventors: Bernhard Max Glaus, St. Gallen; Guido Maag, Niederstetten; Hermann Knus, Gossau, all of Switzerland

[73] Assignee: Ulrich Steinemann AG Maschinenfabrik, St. Gallen, Switzerland

[22] Filed: Mar. 13, 1973

[21] Appl. No.: 340,661

[30] Foreign Application Priority Data
Mar. 27, 1972 Switzerland.................. 4541/72

[52] U.S. Cl............................. 214/6 DK; 214/6 P
[51] Int. Cl............................................ B65g 57/09
[58] Field of Search ......... 214/6 DK, 6 H, 6 P, 6 G, 214/6 M

[56] References Cited
UNITED STATES PATENTS

| | | | |
|---|---|---|---|
| 3,166,203 | 1/1965 | Jeremiah | 214/6 DK |
| 3,278,048 | 10/1966 | Bruce | 214/6 DK |
| 3,362,707 | 1/1968 | Lauren | 214/6 DK |
| 3,486,637 | 12/1969 | Hahn | 214/6 P |
| 3,517,833 | 6/1970 | Shaffer | 214/6 DK |
| 3,594,977 | 7/1971 | Grasvoll | 214/6 DK |
| 3,610,443 | 10/1971 | Berge et al. | 214/6 DK |
| 3,624,782 | 11/1971 | McPeek et al. | 214/6 P |
| 3,737,052 | 6/1973 | Lunden | 214/6 DK |
| 3,743,113 | 7/1973 | Eaton et al. | 214/6 DK |

Primary Examiner—Robert J. Spar
Assistant Examiner—Leslie J. Paperner
Attorney, Agent, or Firm—Weingarten, Maxham & Schurgin

[57] ABSTRACT

Apparatus for stacking loosely adjacent articles, such as sheets of chipboard which have just been sawn to size, in which at least one generally horizontal plate, formed of a flexible resilient material having a low coefficient of friction is moved forwardly and rearwardly. In its forward position, the articles to be stacked are pushed onto the plate, and as the plate moves rearwardly, the articles are stripped therefrom by a stripper located immediately above the upper face of the plate. The stripper can have associated therewith a bar which passes underneath the plate, and forms, with the stripper, a plate guide which can be raised as the plate is moved forwardly over the stack of articles.

6 Claims, 6 Drawing Figures

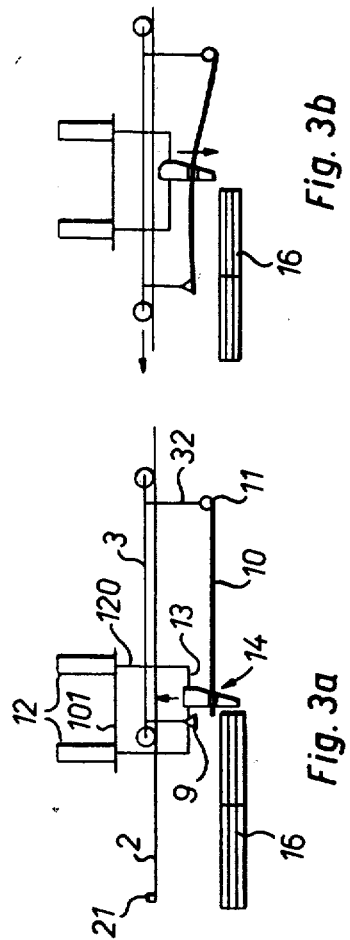
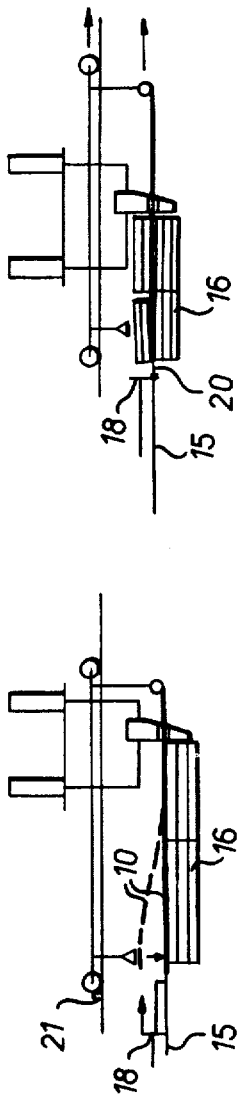
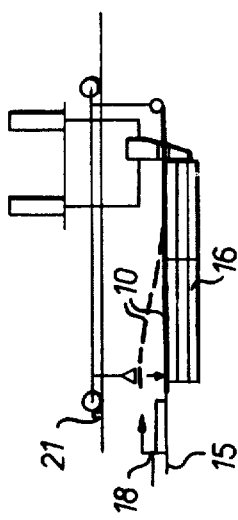
Fig. 3a  Fig. 3b  Fig. 3c  Fig. 3d

APPARATUS FOR STACKING LOOSELY ADJACENT ARTICLES

The present invention relates to apparatus for stacking loosely adjacent articles. One particularly suitable use for the apparatus is in stacking boards or slabs which have been produced by sub-division, especially by sawing larger slabs or boards.

The sawing of thin boards, especially chipboards, of large dimensions by means of circular saws is usually carried out by placing several such boards on top of one another, lining them up relative to one another and then sawing them conjointly. The number of large boards to be sawn per cut in one sawing step depends on the diameter of the circular saw blade. Frequently, several circular saws which simultaneously saw the boards into several strips are arranged next to one another, and devices are also known in which several circular saws are arranged on a carriage at right angles to one another so as to saw the boards, which are stacked on top of one another, in the transverse and longitudinal direction in the minimum time. It is also known to programme the saw device so that individual cuts do not pass through the entire stack but only for a certain distance up to another cut, running at right angles thereto, so that the boards are thus sawn into individual smaller parts of different size.

The total height of the stacked boards which can just still be coped with by the circular saw blade or blades is however relatively low whilst on the other hand for transport purposes as many sawn boards as possible should be stacked on top of one another. Now the problem consists of pushing the boards, sawn into individual pieces, away from the saw table and onto other boards which have already been sawn. Whilst, after sawing, the individual parts still rest in an unchanged position on the saw table, they are however no longer connected to one another. Therefore, when simultaneously pushing all the parts off the saw table it is essential to ensure that none of these parts, and above all none of those which have been produced by sawing the bottom board, strike any obstacle. This is because if this should happen, the bottom board could be lifted up, turned at right angles and possibly turned over, causing other boards or at least a large number thereof to start to slide over one another and finally, after a short time, come to rest completely at random, which can only be corrected by time-consuming manual work.

Of course care will be taken, when pushing the parts onto a stack which is already present, that under these circumstances they should be pushed away with minimum possible difference in height between the saw table and the top of the stack. The lowest boards should on the one hand not push up against the upper edge of the stack which is already present; on the other hand this upper edge must not be lowered unacceptably far below the level of the saw table since there is otherwise the danger that for very small parts the difference in height becomes too great so that they get into an excessively sloping position and as a result tip over, together with all identical parts resting on top of them. Furthermore, it should be borne in mind that chipboards in particular, when sliding over one another, display a high coefficient of sliding friction so that here again there is a danger of the lowest boards being turned over.

According to the invention, we provide apparatus for stacking loosely adjacent articles, such apparatus comprising at least one generally horizontal plate, for receiving said articles on its upper face, means for guiding and moving said plate longitudinally forwardly and rearwardly, and a stripper positioned above said upper face to remove the articles therefrom as the plate is moved longitudinally rearwardly.

In order that the invention may more readily be understood, the following description is given, merely by way of example, reference being made to the accompanying drawings, in which:-

Figure 1:
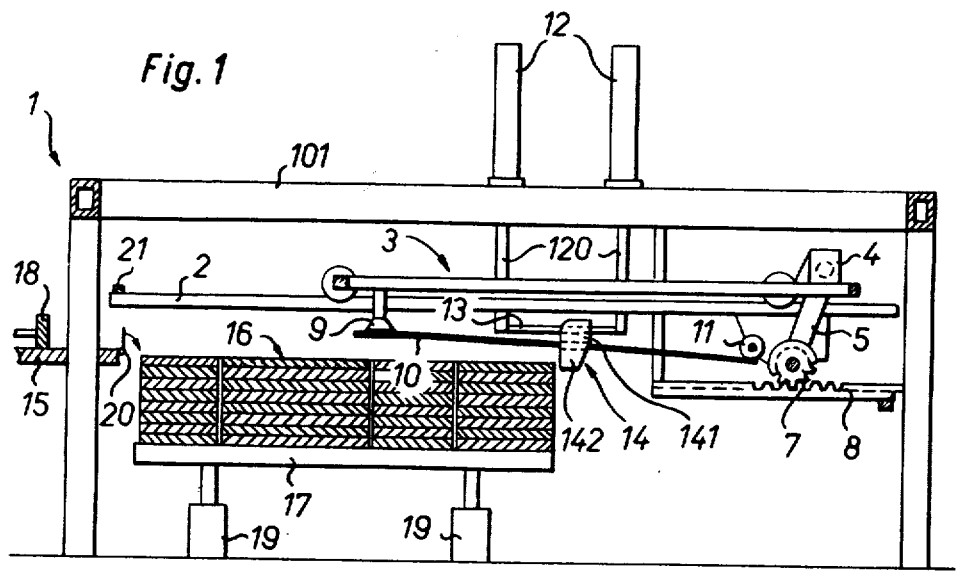
FIG. 1 is a section through one embodiment of apparatus according to the invention, the section being taken along the line 1—1 in FIG. 2.

FIG. 3a to 3d schematically represent the mode of operation of the apparatus.

The apparatus shown includes a fixed frame 1 with longitudinal girders 101. Tracks 2 on which a carriage 3 moves are mounted on frame 1, the carriage 3 having a drive motor 4 which acts, via a reduction transmission 5, on a drive shaft 6. The reduction transmission is here schematically shown as a belt drive or chain drive. At each end, the drive shaft 6 carries a pinion 7 which engages with a rack 8 firmly fixed to the frame 1 so that after switching on the drive 4 the carriage 3 can move forward on the tracks. Instead of the pinions 7 and the racks 8, it would also be possible to drive at least two of the four wheels 31 of the carriage.

Figure 2:
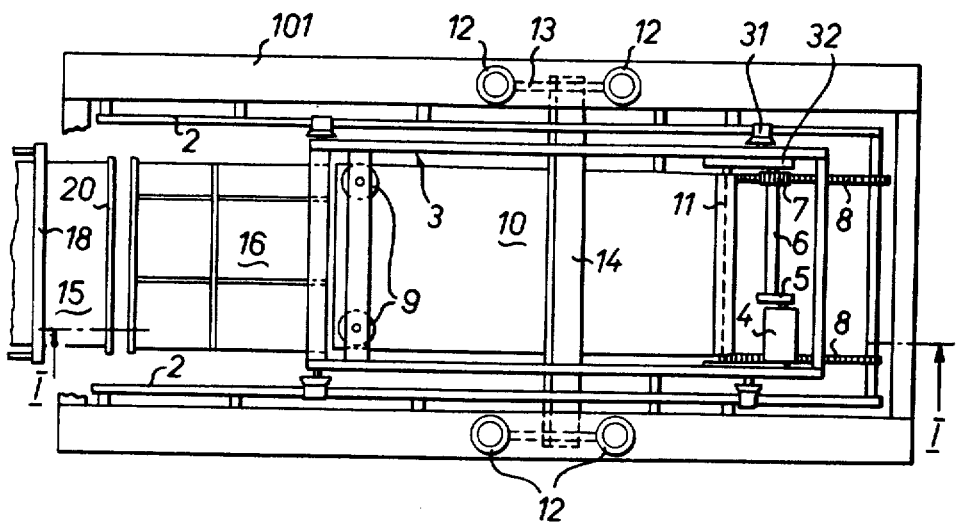
FIG. 2 is a plan view of the apparatus of FIG. 1.

The carriage serves to convey a series of suction grippers 9 (in FIG. 2 only two of these have been shown) and a flexible resilient plate 10. The suction grippers 9 are mounted near one end of the carriage 3 and are firmly connected thereto. In the grippers, a vacuum can be produced and again released, as required, via flexible pipelines which are not shown in more detail.

The plate 10 (appropriately, a thin sheet metal plate) is also mounted on the carriage, but significantly lower than the suction grippers 9. Suitable hanging members 32 are provided for this purpose on the longitudinal sides of the carriage 3; these members project downwards between the tracks 2 and in this embodiment also serve to provide a bearing for the drive shaft 6 of the pinions 7. The lower ends of the two hanging members are connected to one another by a pipe 11 which is carried on these hanging members, by means of suitable bearings, so that it can rotate about axle stubs. The rear or righthand edge of the plate 10 is fixed to the periphery of the pipe, preferably by welding. The purpose of this bearing which can rotate will be explained later.

Instead of a single plate 10, it is also possible to provide several smaller plates which are mounted side-by-side on the periphery of the pipe 11.

On each longitudinal girder 101 of the frame 1 there are two piston and cylinder units 12, of the which the piston rods 120 project downwards through the longitudinal girders 101 and possess a beam 13 at their ends. The two beams are connected by means of a stripper bar 141 which together with a further bar 142 mounted below the stripper bar 141 and joined to it at the ends forms a plate guide 14 for the plate 10, which passes through the slit formed between the stripper bar 141 and the bar 142. The piston and cylinder units 12 are connected, by means of pipelines which are not shown, to any source of pressure medium, so that the piston rods 120 and hence the plate guide 14 can be raised and lowered.

The entire device is appropriately used for the purpose of bringing one or more superposed large boards or slabs, which have been sawn into smaller parts on a saw table 15, onto a stack 16 which is being stacked up on a table or, better still, on a pallet 17. The parts which have been formed by cutting are here conveniently pushed by a slide 18 which forms part of the sawing device. The pallet 17 appropriately rests on cylinders 19 which lower the stack 16 further each time material has been placed on it, so that its surface always remains approximately at the same height as the saw table 15. A flap 20 which can be tilted about its end (see arrow in FIG. 1) bridges the gap between the saw table 15 and the stack 16 and thereby prevents small parts from getting into such an inclined position that they could tip over. The devices just described are however merely suitable accessories to the apparatus, in order to be able to utilize its capacity. The apparatus could, however, be operated without these devices.

Instead of a single pallet 17 it is also possible to provide next to one another several pallets of different size, which has the advantage that after completion of the stacking each pallet can individually be moved away and taken directly to the despatch point.

The mode of operation of the apparatus can be seen from FIGS. 3a to 3d which show, schematically, four different positions of the apparatus.

FIG. 3a shows the starting position. The carriage 3 is in its rearmost position, in which the front end of the plate 10 still just lies in the slot of the plate guide 14. The plate guide 14 has been lowered to its bottom position by the two cylinder-piston units 12 so that the plate 10 hangs horizontally between the guide 14 and the pipe 11.

The carriage 3 is now pushed forwardly to the left by means of its own drive (not shown here) (FIG. 3b). As a result, the plate 10 slides through the guide 14, the guide being only vertically displaceable but not horizontally displaceable. At the same time the guide 14 is raised so as to rest the front edge of the plate 10 against the suction grippers 9, which are firmly fixed to the carriage 3 and move forward with the carriage. The plate now assumes a curved position since the pipe 11 is not adjustable in height. The need to have the pipe 11 arranged so that it can rotate is now appreciated; it serves to avoid excessive twisting of the plate 10. As the pipe 11 progressively approaches the guide 14, the latter is again lowered to avoid the danger of kinking the plate 10.

It can be seen from FIG. 3b, but especially from the position of the plate 10 shown in broken lines in FIG. 3c that its front edge is always raised when being drawn over the stack 16. This avoids it striking the stack 16 in any way and to a certain extent avoids any sliding friction of the plate 10 on the stack 16. A sliding friction merely arises in the last stage of drawing the plate over the stack, when the rear edge of the plate 10, which has not been raised, reaches the stack. Lifting the front edge avoids the stack 16 being exposed to lateral shear forces which could mutually displace the individual parts of the stack.

When the end position has been reached, a suitable device, appropriately a limit switch 21, feeds a signal to the controls of the supply of the pressure medium, so that the vacuum in the suction grippers 9 is released and the plate 10 drops down. This now rests flat on the stack 16 and covers it completely. The slide 18 now pushes a new layer of sawn chipboards along from the saw table 15, the flap 20 being tipped into its horizontal position by these parts (FIG. 1). This pushing takes place easily because the parts can easily slide on the completely smooth surface of the plate 10 and not on the rough surface of the stack 16. This avoids any twisting, displacement or turning over of individual parts.

FIG. 3d shows the return of the carriage 3 into its starting position. The plate 10 is drawn with it and strips off the parts lying on it against the stripper bar 141 so that these settle on the stack 16 without changing their relative position. The stack subsequently moves downwards by the amount of the total thickness of the parts which have been newly placed on it, whereupon the device starts a new working cycle.

Instead of the plate guide 14, the suction grippers 9 can also be arranged so as to be vertically movable. At the beginning of the forward movement, these suction grippers move downwards as far as the plate 10 in order to grip the latter. At the same time the pallet 17 is lowered and is only raised again after completion of the forward movement. Since the pallet 17 is in any case vertically displaceable, this only slightly changes its stroke position.

What we claim is:

1. Apparatus for stacking loosely adjacent articles, said apparatus comprising:
   at least one normally generally horizontal plate having an upper face for receiving said articles and having exposed front and rear edges;
   means for guiding and moving said plate longitudinally forwardly and rearwardly, said entire plate being maintained substantially planar during said guiding and moving by said means for guiding and moving; and,
   a stripper positioned above said upper face effective to remove said articles therefrom as said plate is moved longitudinally rearwardly;
   wherein said horizontal plate is constructed of a resilient flexible material which is incapable of supporting itself.

2. Apparatus as claimed in claim 1, wherein said plate is constructed of a material having a low coefficient of friction.

3. Apparatus for stacking loosely adjacent articles, said apparatus comprising;
   at least one generally horizontal plate having an upper face and having front and rear edges;
   means for guiding and moving said plate longitudially forwardly and rearwardly;
   a stripper positioned above said upper face effective to remove said articles therefrom as said plate is moved longitudially rearwardly;
   a bar located under said stripper and defining with therewith a guide slot for said plate through which the plate can be moved, whereby said stripper and bar form a plate guide;
   means to raise and lower said plate guide during movement of said plate; and
   suction pads moveable with said plate, said suction pads being located forwardly of said stripper, whereby when said plate guide is raised, said suction pads contact the upper face of said plate in the vicinity of said front edge.

4. Apparatus as claimed in claim 3, and further comprising a reciprocable carriage, a support mounted for pivotal movement about a horizontal axis on said carriage, said support being connected to the rear edge of said plate and allowing the slope of said plate to alter during its movement, said suction pads mounted on said carriage forwardly of said stripper is raised, said suction pads contact the upper face of said plate in the vicinity of its front edge.

5. Apparatus for stacking loosely adjacent articles on a supporting surface, said apparatus comprising:
   at least one generally horizontal plate having an upper face for receiving said articles and having front and rear edges;
   means for guiding and moving said plate longitudinally forwardly and rearwardly;
   a stripper positioned above said upper face effective to remove said articles therefrom as said plate is moved longitudinally rearwardly, there being no relative motion between the articles being stacked and the supporting surface during longitudinal motion of said horizontal plate;
   a bar located under said horizontal plate and joined to said stripper to thereby define with the latter a guide slot for the plate, through which the plate can be moved, whereby said stripper and bar form a plate guide; and
   means to raise and lower said plate guide during movement of said plate.

6. Apparatus as claimed in claim 5, wherein said means to move said plate include a reciprocable carriage, a support mounted for pivotable movement about a horizontal axis on said carriage, said support being connected to the rear edge of said plate, said support thereby allowing the slope of said plate to be altered during movement.

* * * * *